(12) United States Patent
Saito et al.

(10) Patent No.: US 11,836,303 B2
(45) Date of Patent: Dec. 5, 2023

(54) METHOD FOR CORRECTING GAP BETWEEN PEN COORDINATE AND DISPLAY POSITION OF POINTER

(71) Applicant: Wacom Co., Ltd., Kazo (JP)

(72) Inventors: Shunya Saito, Kazo (JP); Shigeyuki Sano, Kazo (JP); Igor Karsuntsev, Kazo (JP); JuiMin Liu, Kazo (JP); Jun Kadowaki, Kazo (JP)

(73) Assignee: Wacom Co., Ltd., Kazo (JP)

( * ) Notice: Subject to any disclaimer, the term of this patent is extended or adjusted under 35 U.S.C. 154(b) by 81 days.

(21) Appl. No.: 16/630,410

(22) PCT Filed: Jul. 10, 2018

(86) PCT No.: PCT/JP2018/026090
§ 371 (c)(1),
(2) Date: Jan. 10, 2020

(87) PCT Pub. No.: WO2019/013222
PCT Pub. Date: Jan. 17, 2019

(65) Prior Publication Data
US 2020/0159386 A1    May 21, 2020

(30) Foreign Application Priority Data

Jul. 14, 2017   (JP) .................... 2017-138308

(51) Int. Cl.
*G06F 3/0354*   (2013.01)
*G06F 3/044*    (2006.01)
*G06F 3/041*    (2006.01)

(52) U.S. Cl.
CPC ...... *G06F 3/03545* (2013.01); *G06F 3/03546* (2013.01); *G06F 3/0446* (2019.05);
(Continued)

(58) Field of Classification Search
CPC .. G06F 3/03545; G06F 3/0446; G06F 3/0448; G06F 3/04186; G06F 3/03546;
(Continued)

(56) References Cited

U.S. PATENT DOCUMENTS

| 2013/0009907 A1* | 1/2013 | Rosenberg ............ G06F 3/046 345/174 |
| 2014/0078105 A1* | 3/2014 | Son ...................... G06F 3/0418 361/679.01 |

(Continued)

FOREIGN PATENT DOCUMENTS

| CN | 106155356 A | 11/2016 |
| JP | 11-212713 A | 8/1999 |

(Continued)

OTHER PUBLICATIONS

Written Opinion of the International Searching Authority dated Aug. 21, 2018, issued in corresponding International Application No. PCT/JP2018/026090, filed Jul. 10, 2018, 12 pages.

(Continued)

*Primary Examiner* — Ifedayo B Iluyomade
(74) *Attorney, Agent, or Firm* — CHRISTENSEN O'CONNOR JOHNSON KINDNESS PLLC

(57) ABSTRACT

Disclosed herein is a method executed by a device that is configured to be able to detect a pointed position of a stylus on an operation plane being superimposed on a displaying part. The method includes receiving feedback information relating to a display position of a predetermined pattern on the displaying part from a host processor, updating at least some of plural position calibration values stored in a correction table that stores therein the position calibration value for each of plural positions arranged on the operation plane, on a basis of the received feedback information, detecting a tentative pointed position of the stylus, reading the position calibration value that corresponds to the tentative pointed (Continued)

position from the correction table and deriving an output position by correcting the tentative pointed position on a basis of the position calibration value, and reporting the output position to the host processor.

22 Claims, 10 Drawing Sheets

(52) U.S. Cl.
CPC ........ *G06F 3/0448* (2019.05); *G06F 3/04186* (2019.05); *G06F 2203/04106* (2013.01)

(58) Field of Classification Search
CPC .... G06F 3/04162; G06F 3/0442; G06F 3/038; G06F 2203/04106
See application file for complete search history.

(56) References Cited

U.S. PATENT DOCUMENTS

| | | | | |
|---|---|---|---|---|
| 2014/0152582 A1* | 6/2014 | Agarwal | ............... | G06F 3/0418 345/173 |
| 2015/0338932 A1* | 11/2015 | Pant | ................... | G06F 3/03545 345/174 |
| 2016/0062470 A1* | 3/2016 | Pandey | ................. | G06F 3/0346 702/150 |
| 2016/0196002 A1* | 7/2016 | Kuge | ................. | G06F 3/04883 345/178 |
| 2016/0224825 A1* | 8/2016 | Tomita | ................. | G06V 40/167 |
| 2017/0176822 A1* | 6/2017 | Yoon | ................. | G02F 1/133514 |
| 2018/0164948 A1* | 6/2018 | Dinu | ..................... | G06F 3/0446 |
| 2018/0267633 A1* | 9/2018 | Keidar | ................ | G06F 3/03545 |
| 2018/0267757 A1* | 9/2018 | Segal | ...................... | G06F 3/042 |
| 2019/0302910 A1* | 10/2019 | Kim | .................... | G06F 3/04186 |

FOREIGN PATENT DOCUMENTS

| | | |
|---|---|---|
| JP | 2014092809 A | 5/2014 |
| JP | 2014139759 A | 7/2014 |
| JP | 2014142676 A | 8/2014 |
| WO | 2013/065272 A1 | 5/2013 |

OTHER PUBLICATIONS

International Preliminary Report on Patentability dated Jan. 14, 2020, issued in corresponding International Application No. PCT/JP2018/026090, filed Jul. 10, 2018, 1 page.

International Search Report dated Aug. 21, 2018, issued in corresponding International Application No. PCT/JP2018/026090, filed Jul. 10, 2018, 4 pages.

Written Opinion of the International Searching Authority dated Aug. 21, 2018, issued in corresponding International Application No. PCT/JP2018/026090, filed Jul. 10, 2018, 8 pages.

Chinese Office Action dated Mar. 25, 2023, issued in corresponding Chinese Patent Application No. 201880046422.9, filed Jul. 10, 2018, 11 pages.

Japanese Office Action dated Dec. 6, 2022, issued in corresponding Japanese Patent Application No. JP2019-529741, filed Apr. 15, 2019, 5 pages.

* cited by examiner

FIG.1
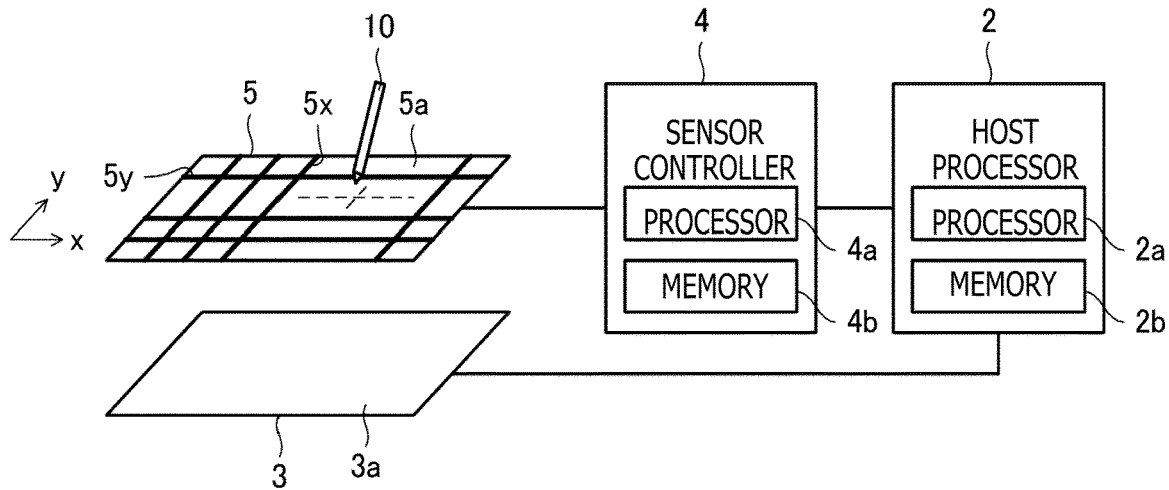
FIG.2
| POSITION | CALIBRATION VALUE |
|---|---|
| (x0,y0) | (A0,D0) |
| (x1,y1) | (A1,D1) |
| (x2,y2) | (A2,D2) |
| ⋮ | ⋮ |
FIG.3
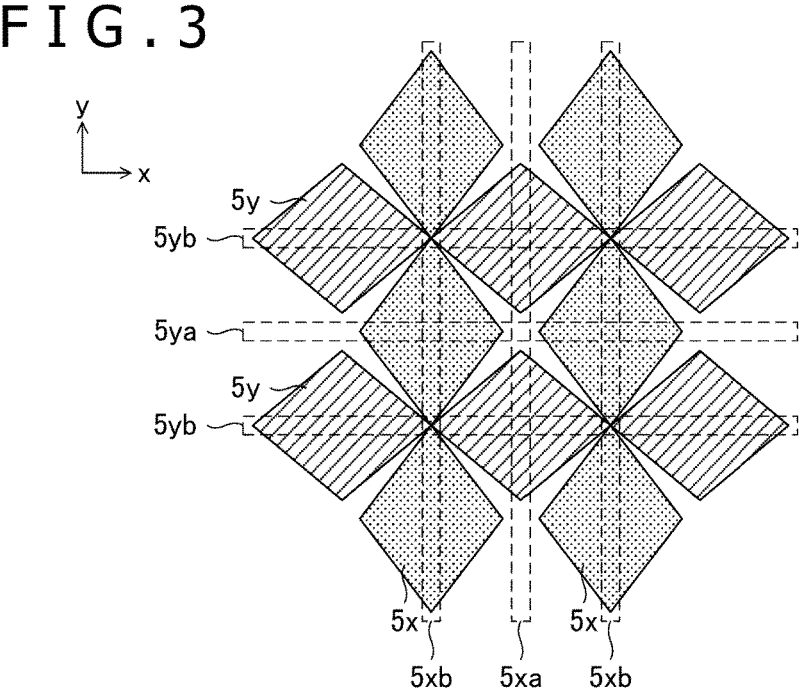

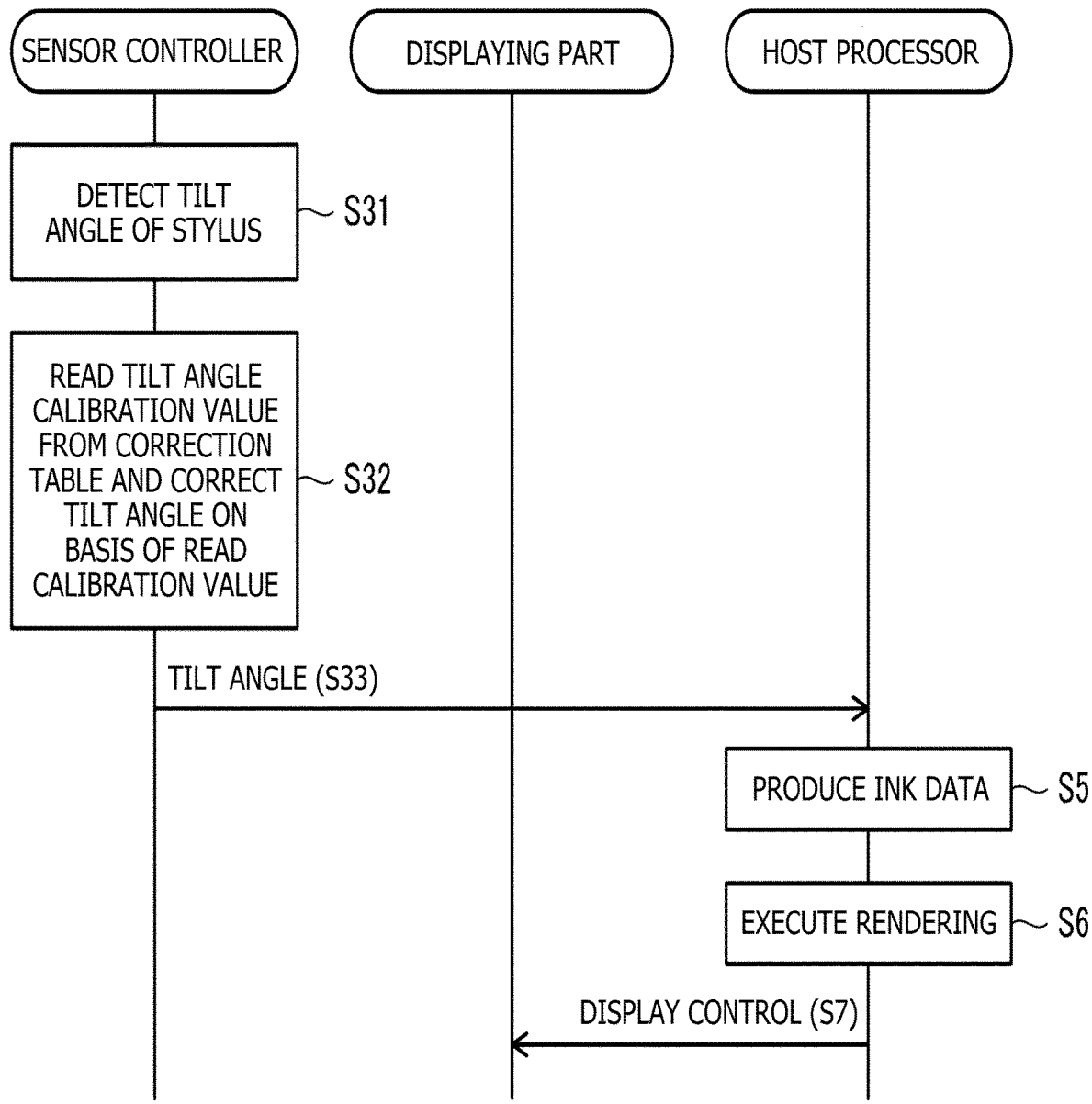

METHOD FOR CORRECTING GAP BETWEEN PEN COORDINATE AND DISPLAY POSITION OF POINTER

BACKGROUND OF THE INVENTION

1. Field of the Invention

The present invention relates to a method for correcting a gap between a pen coordinate and a display position of a pointer.

2. Description of the Related Art

Styluses of various schemes have recently become available each as a tool to input by handwriting on an electronic device such as a tablet terminal. Above all, a stylus called "active stylus" includes a power source part and a signal processing circuit, and is configured to be able to transmit a pen signal toward a sensor controller in the electronic device by supplying an electric charge in accordance with a signal produced by the signal processing circuit to an electrode (a pen electrode) disposed in the vicinity of the tip of the stylus. The pen signal includes a position signal that is a burst signal to inform of the position of the electrode, pen pressure data that indicates the value of the pen pressure detected by the stylus, data that indicates an ON/OFF status of an operation button disposed on a side face or the terminal end of the stylus, and a data signal that includes various types of data such as the unique identification (ID) written in the stylus in advance.

In addition to the sensor controller, the electronic device includes a liquid crystal displaying apparatus, a touch sensor, a host processor, and a storage apparatus. The touch sensor is an apparatus that includes electrode groups arranged and disposed in a matrix and each including plural electrodes and that is arranged on a screen of the liquid crystal displaying apparatus. When the active stylus supplies a charge to the pen electrode to transmit a pen signal, an electric field is generated in a space in the vicinity of the pointed position of the active stylus, and a charge is thereby induced in the electrode group that constitutes the touch sensor. The sensor controller detects for each of the electrodes a variation of the charge induced in this manner, thereby detects the pen signal transmitted by the stylus, and executes position detection for the active stylus and reception of data transmitted by the active stylus, on the basis of the detection.

The sensor controller is configured to output the coordinate (a pen coordinate) that represents the detected position and the received data to the host processor. The host processor produces ink data on the basis of the pen coordinate and the data supplied as above and displays the ink data on a screen of the liquid crystal displaying apparatus. The characters and figures written and drawn on the touch sensor by the user using the stylus can thereby be displayed on the liquid crystal displaying apparatus in real time. The host processor also executes a process of storing the produced ink data in the storage apparatus.

The sensor controller detects a variation of the capacitance generated by contact of a finger with the electrode group and thereby also detects the position of the finger touch. Especially, the detection of the active stylus and the detection of the finger touch are executed using the same electrode group in a time-sharing manner. The sensor controller also outputs the coordinate representing the position of the finger touch detected in this manner to the host processor, and the host processor having this received therein produces ink data similarly to the case for the stylus, displays the produced ink data on the liquid crystal displaying apparatus, and stores the produced ink data in the storage apparatus.

Japanese Patent Publication No. Hei 5-31766 (hereinafter, Patent Document 1) discloses a technique according to which, concerning the case where an ultrasonic coordinate detector is disposed on a cathode-ray tube (CRT) display, the CRT display is caused to display plural reference points thereon, a user is caused to touch the reference points, and the coordinates output from the coordinate detector are corrected on the basis of the coordinates obtained as the result of the touching.

Moreover, Japanese Patent No. 6021174 discloses a technique according to which three pen electrodes are disposed on a stylus and the inclination of the stylus is calculated by an electronic device using pen signals transmitted from these pen electrodes.

Relating to the above, with the above electronic device, a gap may be generated between the position of the touch by the user using the stylus (the pen coordinate) and the position of a line displayed on the screen as the result of the touch (a display position of the pointer). Various causes can be considered as the cause of the generation of the gap, such as, in addition to a positional gap based on the mechanism generated when the touch sensor and the liquid crystal displaying apparatus are assembled, a difference in the combination of a touch sensor and a stylus, and the difference for each user in each of the dominant hand, the manner of holding the stylus, the display view point position, and writing speed while, in any case, when this type of gap is generated, this gap brings a feeling of strangeness to the user and reduction of the gap is therefore demanded.

The technique disclosed in Patent Document 1 is one method for correcting this type of gap while this technique can only apply uniform correction based on linear transformation to the overall touch sensor. Actually generated gaps differ from each other in the size and the direction in smaller units (such as, for example, the area units and the pixel units) and, moreover, transformation unable to be represented by any linear transformation may be necessary. The technique disclosed in Patent Document 1 is therefore unsatisfactory.

SUMMARY OF THE INVENTION

An object of the present invention is therefore to provide a method that can accurately correct the gap between the pen coordinate and the display position of the pointer compared to the related techniques.

The method for correcting a gap between a pen coordinate and a display position of ink data according to an aspect of the present invention is a method executed by a device that is configured to be able to detect a pointed position of a stylus on an operation plane disposed being superimposed on a displaying part, and includes receiving feedback information relating to a display position of a predetermined pattern on the displaying part from a host processor, updating at least some of plural position calibration values stored in a correction table that stores therein the position calibration value for each of plural positions arranged on the operation plane on the basis of the received feedback information, detecting a tentative pointed position of the stylus, reading the position calibration value that corresponds to the tentative pointed position from the correction table and deriving an output position by correcting the tentative pointed position on the basis of the position calibration value, and reporting the output position to the host processor.

The method for correcting a gap between a pen coordinate and a display position of ink data according to another aspect of the present invention is a method executed by a device that is configured to be able to detect a pointed position of a stylus on an operation plane disposed being superimposed on a displaying part, and includes obtaining a first value that is a pointed position of the stylus on the basis of a pen signal transmitted by the stylus through a first electrode disposed in the vicinity of a pen tip, obtaining a second value relating to the stylus, deriving an output position by correcting the first value on the basis of the calibration value for the first value obtained on the basis of the second value, and reporting the output position to the host processor.

The method for correcting a gap between a pen coordinate and a display position of ink data according to yet another aspect of the present invention is a method executed by a device that is configured to be able to detect a pointed position of a stylus on an operation plane disposed being superimposed on a displaying part, and includes obtaining a first value that is a pointed position of the stylus on the basis of a pen signal transmitted by the stylus through a first electrode disposed in the vicinity of a pen tip, obtaining a second value that is a pointed position of the stylus on the basis of a variation of a capacitance generated between plural electrodes disposed in the operation plane and the first electrode, and deriving a tilt of the stylus on the basis of the first and the second values.

According to an aspect of the present invention, the position calibration value in the correction table can be updated on the basis of a pointed position of the stylus on the operation plane obtained when a predetermined pattern is displayed on the displaying part and the display position of the predetermined pattern on the displaying part. Any gap can therefore be accurately corrected between the pen coordinate and the display position of the ink data.

Moreover, according to another aspect of the present invention, the pointed position of the stylus can be corrected on the basis of a second value that relates to the stylus, and any gap can therefore be accurately corrected between the pen coordinate and the display position of the ink data.

Moreover, according to yet another aspect of the present invention, a tilt of the stylus can be derived on the basis of the first and the second values, and any gap can therefore be accurately corrected between the pen coordinate and the display position of the ink data.

BRIEF DESCRIPTION OF THE DRAWINGS

FIG. 1 is a diagram depicting the configuration of an electronic device and that of a stylus according to a first embodiment of the present invention;

FIG. 2 is a diagram depicting a correction table according to the first embodiment of the present invention;

FIG. 3 is a diagram explaining the reason why the correction table is necessary;

FIG. 10 is a sequence diagram depicting operations of the electronic device according to a modification example of the first embodiment of the present invention;

DETAILED DESCRIPTION OF THE PREFERRED EMBODIMENTS

Figure 4:
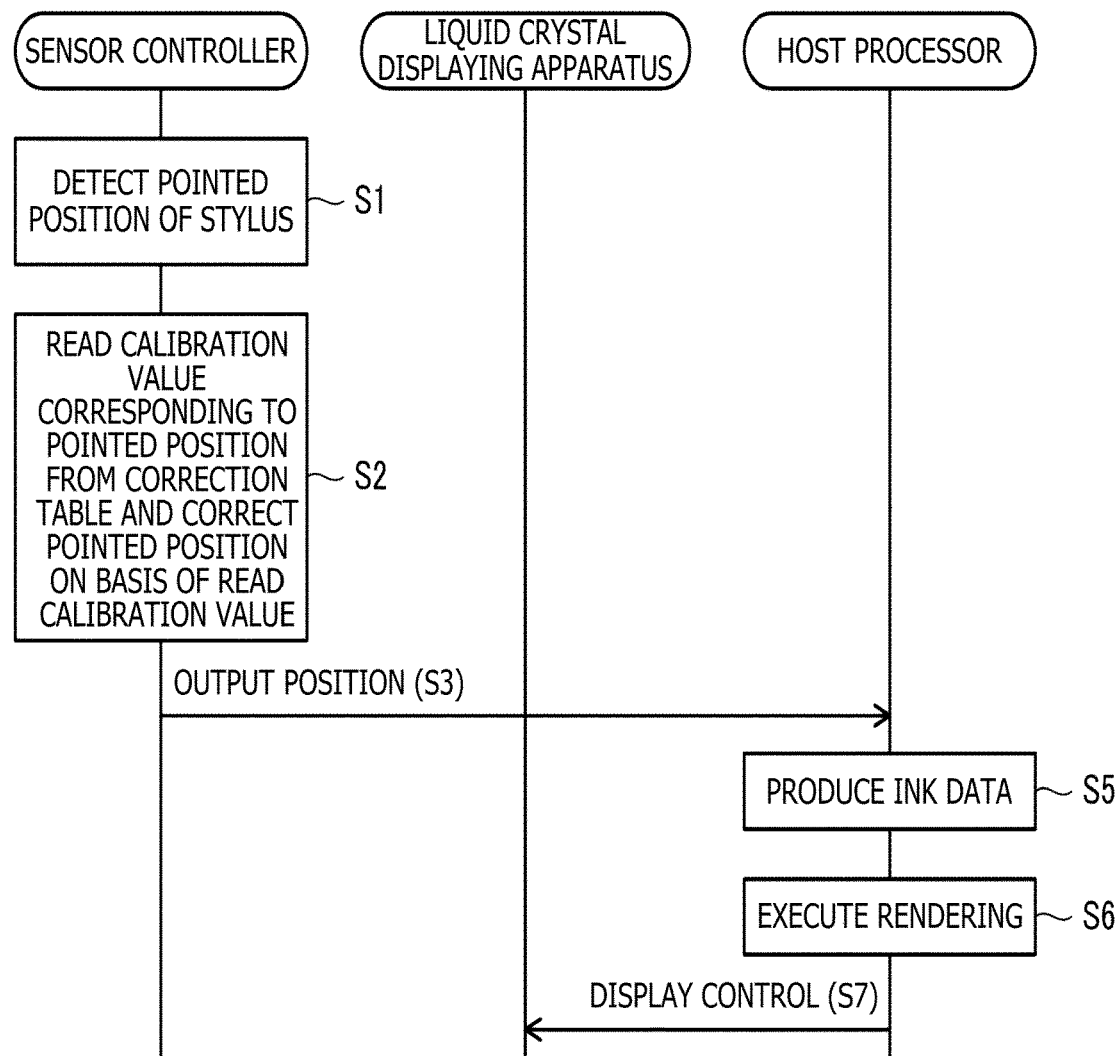
FIG. 4 is a sequence diagram depicting operations of the electronic device in the first embodiment of the present invention.

Embodiments of the present invention will be described in detail below with reference to the accompanying drawings.

FIG. 1 is a diagram depicting the configuration of an electronic device 1 and that of a stylus 10 according to a first embodiment of the present invention. The electronic device 1 according to the present embodiment is, for example, a tablet computer and, as depicted in FIG. 1, includes a host processor 2, a liquid crystal displaying apparatus 3, a sensor controller 4 (a device), and a touch sensor 5. The stylus 10 is the active stylus.

The host processor 2 is a computer including a processor 2a and a memory 2b. The processor 2a reads and executes programs stored in the memory 2b and thereby executes various processes such as control of the components of the electronic device 1 including the depicted liquid crystal displaying apparatus 3 and the depicted sensor controller 4, and execution of various apps including an app for drawing. The memory 2b includes a main memory such as a dynamic random access memory (DRAM), and an auxiliary storage apparatus such as a flash memory.

The liquid crystal displaying apparatus 3 is an apparatus including a liquid crystal panel 3a (a displaying part) that includes plural pixels arranged in a matrix, and a driving circuit (not depicted) that executes optional display by driving the liquid crystal panel 3a. The driving circuit is configured to receive the control by the host processor 2 and drive the pixels of the liquid crystal panel 3a.

The sensor controller 4 and the touch sensor 5 are each an inputting apparatus for the host processor 2. Specifically describing, the touch sensor 5 includes a touch plane 5a (an operation plane) that is a plane to be touched by the stylus 10 or a user's finger, and plural linear electrodes 5x and plural linear electrodes 5y that are arranged immediately beneath the touch plane 5a. The touch plane 5a is disposed being superimposed on the liquid crystal panel 3a of the liquid crystal displaying apparatus 3, and the plural linear electrodes 5x and the plural linear electrodes 5y are arranged between the touch plane 5a and the liquid crystal panel 3a. The plural linear electrodes 5x each extend in a depicted y-direction (a direction in the touch plane 5a) and are arranged at equal intervals from each other in a depicted x-direction (the direction perpendicular to the y-direction in the touch plane 5a). The plural linear electrodes 5y each extend in the depicted x-direction and are arranged at equal intervals from each other in the depicted y-direction. Either one of the plural linear electrodes 5x and the plural linear electrodes 5y may commonly be used with common electrodes (not depicted) in the liquid crystal panel 3a.

The sensor controller 4 is a custom large scale integration (LSI) (an integrated circuit) including a processor 4a and a memory 4b, and is configured such that the processor 4a reads and executes programs stored in the memory 4b and the pointed positions of the stylus 10 and the user's finger on the touch plane 5a are thereby detected and a data signal transmitted by the stylus 10 is thereby receivable. The detection of the pointed position of the stylus 10 is executed in accordance with a capacitance scheme or an active capacitance scheme. Moreover, the detection of the position of the user's finger is executed in accordance with the capacitance scheme.

The capacitance scheme is a scheme according to which, on the basis of a variation of the capacitance generated between the plural linear electrodes 5x and 5y, and a pen electrode 10a (see FIG. 5) disposed in the vicinity of the pen tip of the stylus 10 or the user's finger, the pointed positions of these are obtained. In the case where the position detection is executed in accordance with the capacitance scheme, the sensor controller 4 supplies a predetermined signal for detection to each of the plural linear electrodes 5x and measures the potential of each of the plural linear electrodes 5y. In the case where the pen electrode 10a or the user's finger is close to an intersection of a certain linear electrode 5x and a certain linear electrode 5y, a portion of the charge flowing from the certain linear electrode 5x toward the certain linear electrode 5y outflows toward the human body of the user, and the current or the potential measured for the certain linear electrode 5y is therefore reduced. The sensor controller 4 detects the pointed position of the stylus 10 or the user's finger.

The active capacitance scheme is a scheme according to which the pen signal transmitted by the stylus 10 is received by the touch sensor 5 and the pointed position of the stylus 10 is detected on the basis of the result of the reception. The pen signal includes the position signal that is a non-modulated burst signal, and the data signal that indicates various types of data relating to the stylus 10. The various types of data include pen pressure data indicating the pressure applied to the pen tip of the stylus 10, side switch information indicating the ON/OFF status of a side switch (not depicted) of the stylus 10, the unique ID assigned to the stylus 10 in advance, and the like.

In the case where the detection of the pointed position is executed in accordance with the active capacitance scheme, the sensor controller 4 receives a position signal at each of the plural linear electrodes 5x and 5y and detects the pointed position of the stylus 10 on the basis of the result of the reception. Moreover, the sensor controller 4 receives the data signal detected by the stylus 10 using the linear electrode 5x or 5y that is closest to the detected pointed position of the plural linear electrodes 5x and 5y.

The sensor controller 4 is configured to report the coordinates indicating the pointed positions of the stylus 10 and the user's finger detected as above and the various types of data included in the data signal received from the stylus 10, to the host processor 2. For the pointed position of the stylus 10, however, the coordinate after being corrected using the correction table (the one stored in the memory 4b) described later is handled to be reported. The details of this point will be described later. Moreover, the sensor controller 4 is configured to obtain pen-down information indicating the fact that the stylus 10 is in contact with the touch plane 5a and pen-up information indicating the fact that the stylus 10 is distant from the touch plane 5a on the basis of the pen pressure data received from the stylus 10, and report these facts each at its timing to the host processor 2.

Triggered by the inputting of the coordinate from the sensor controller 4, the host processor 2 executes display of the pointer on the basis of the status of each of applications that operate on the desk top or the front of the operating system operating at the coordinate position. Of these, the display of the pointer is executed by displaying a predetermined pointer image at the position of the pen tip that corresponds to the input coordinate on the panel plane of the liquid crystal displaying apparatus 3.

Depending on the application such as a drawing application, the position of the pointer is displayed to be like a series of trajectories formed by plural coordinates sequentially supplied from the sensor controller 4 as ink data. For the user's finger, the host processor 2 starts production of the ink data triggered by the fact that the inputting of the coordinate is started, and ends the production of the ink data triggered by the fact that the inputting of the coordinate is ended. On the other hand, for the stylus 10, the host processor 2 starts production of the ink data triggered by the fact that the pen-down information is input, and ends the production of the ink data triggered by the fact that the pen-up information is input. In addition, when the ink data is produced for the stylus 10, the host processor 2 also executes control of the width and/or the degree of transparency of curved line data that constitutes the ink data, on the basis of the pen pressure data, the side switch information, the unique ID, and the like received from the stylus 10. The host processor 2 executes the rendering of the produced ink data, and causes the liquid crystal displaying apparatus 3 to display thereon the produced ink data and causes the memory 2b to store therein the produced ink data.

FIG. 2 is a diagram depicting a correction table stored in the memory 4b. The correction table is a table that stores therein a calibration value (a position calibration value) for each of plural positions arranged on the touch plane 5a, and is stored in the memory 4b in the stage of the shipping from the plant. As depicted in FIG. 2, the calibration value is represented by the direction (Ai) and the distance (Di) from the corresponding position (xi, yi) (i is an integer equal to zero or larger). The manner of selecting the plural positions stored in the correction table is not limited and, for example, the positions corresponding to the pixels of the liquid crystal panel 3a may be used or the positions corresponding to intersections of the plural linear electrodes 5x and 5y may be used. Moreover, the correction table may include the calibration values for a position (xi) and a position (yi), or a relative position (Δxi, Δyi) from the closest linear electrode or an intersection may be used instead of the absolute position.

FIG. 3 is a diagram explaining the reason why the correction table is necessary. FIG. 3 depicts two electrodes for each of the linear electrodes 5x and the linear electrodes 5y. As depicted in FIG. 3, actual linear electrodes 5x and 5y each do not have a simple rectangular shape and may each have a shape formed by beading plural lozenge shapes. The size and the arrangement of each of the lozenge shapes are set for the linear electrodes 5x and 5y to intersect each other in each of the connection portions of the lozenge shapes. Moreover, though not depicted, the inside of the lozenge shape is filled with not a uniform conductor but a mesh conductor lines.

The reception level at the sensor controller 4 of the pen signal transmitted by the stylus 10 is varied in accordance with the relative positional relation between the stylus 10 and the linear electrodes 5x and 5y. In the case where the linear electrodes 5x and 5y are each formed to have the lozenge shape as in FIG. 3, the reception level of the pen signal becomes higher as the stylus 10 is closer to the edge of each of the linear electrodes 5x and 5y and, therefore, roughly describing, the reception level becomes relatively high in depicted areas 5xa and 5ya and the reception level becomes relatively low in depicted areas 5xb and 5yb. Moreover, even in the case where the linear electrodes 5x and 5y are formed in stripes, the reception level of the pen signal is similarly varied in accordance with the positional relation between the pointed position of the stylus 10 and the linear electrodes 5x and 5y. As above, as the result of the variation of the reception level of the pen signal due to the position in the touch plane 5a, the pointed position detected on the basis of the position signal is somewhat shifted from the original pointed position (the contact position for the pen tip and the touch plane 5a with each other). The correction table is prepared to correct this gap.

FIG. 4 is a sequence diagram depicting operations of the electronic device 1 including a correction process for the detected position that uses the correction table. As depicted in FIG. 4, when the sensor controller 4 detects the pointed position of the stylus 10 (step S1: a tentative pointed position detection step), the sensor controller 4 reads the calibration value that corresponds to the detected pointed position from the correction table and derives an output position by correcting the pointed position on the basis of the read calibration value (step S2: a correction step). The sensor controller 4 thereafter reports the derived output position to the host processor 2 (step S3: an output step).

The host processor 2 receiving the report of the output position produces the above ink data on the basis of the output position that is input thereinto (step S5). The host processor 2 thereafter executes rendering of the produced ink data (step S6) and controls the display on the liquid crystal displaying apparatus 3 using the drawing data obtained as the result of the rendering (step S7). A line drawn by the user on the touch plane 5a using the stylus 10 is thereby displayed on the liquid crystal panel 3a.

In addition to the above processes, the electronic device 1 according to the present embodiment is characterized in the point that the electronic device 1 executes a process of reflecting a gap between the pen coordinate and the display position of the ink data, generated by the fact that the user holds the stylus 10 obliquely to the touch plane 5a, to the correction table. This point will be described in detail below.

Figure 5:
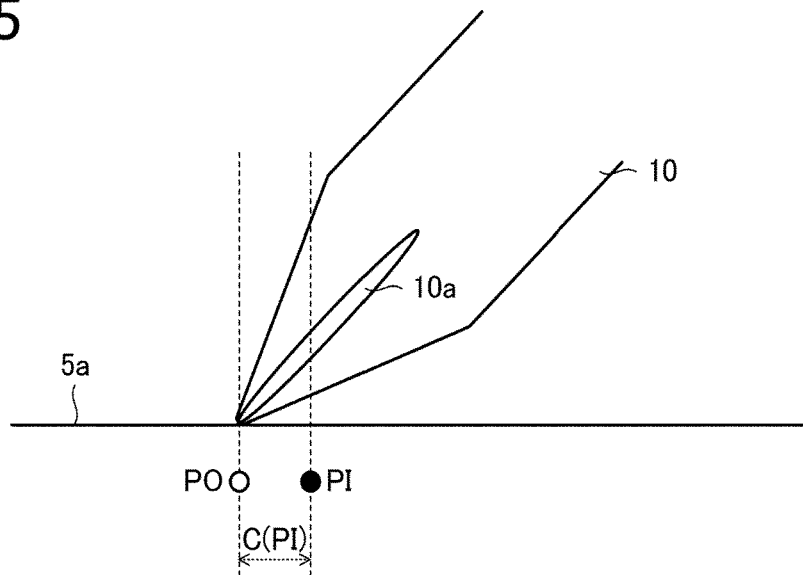
FIG. 5 is an explanatory diagram for the configuration of the stylus, a tentative pointed position, a pointed position, and a calibration value according to the first embodiment of the present invention.

FIG. 5 is an explanatory diagram for the configuration of the stylus 10, a tentative pointed position PI, a pointed position PO, and a calibration value C(PI) according to the present embodiment. The tentative pointed position PI is the pointed position detected by the sensor controller 4 at step S4 in FIG. 3, and the pointed position PO is the position at which the stylus 10 and the touch plane 5a are actually in contact with each other.

As depicted in FIG. 5, the pen electrode 10a functioning as a transmission antenna for the pen signal is disposed inside the stylus 10. More specifically, because the pen electrode 10a is a conductor that has a specific length along the axis direction of the stylus 10, a gap is generated between the tentative pointed position PI and the pointed position PO as depicted in FIG. 5 when the user holds the stylus 10 obliquely to the touch plane 5a. To correct this gap, the electronic device 1 displays a predetermined pattern on the liquid crystal panel 3a, causes the user to trance the predetermined pattern, derives for each of the positions stored in the correction table the calibration value C(PI) that corresponds to the amount of the gap between the tentative pointed position PI and the pointed position PO on the basis of the result of the tracing, and updates the correction table using the derived calibration value C(PI). The gap between the tentative pointed position PI and the pointed position PO can be dissolved by executing the above as far as the user maintains the same manner of holding. Moreover, the coordinate after being corrected using this method can be established as the position that absorbs the parallax error generated by the display plane, the thickness of the glass plate covering the display plane, and the like.

Figure 6A:
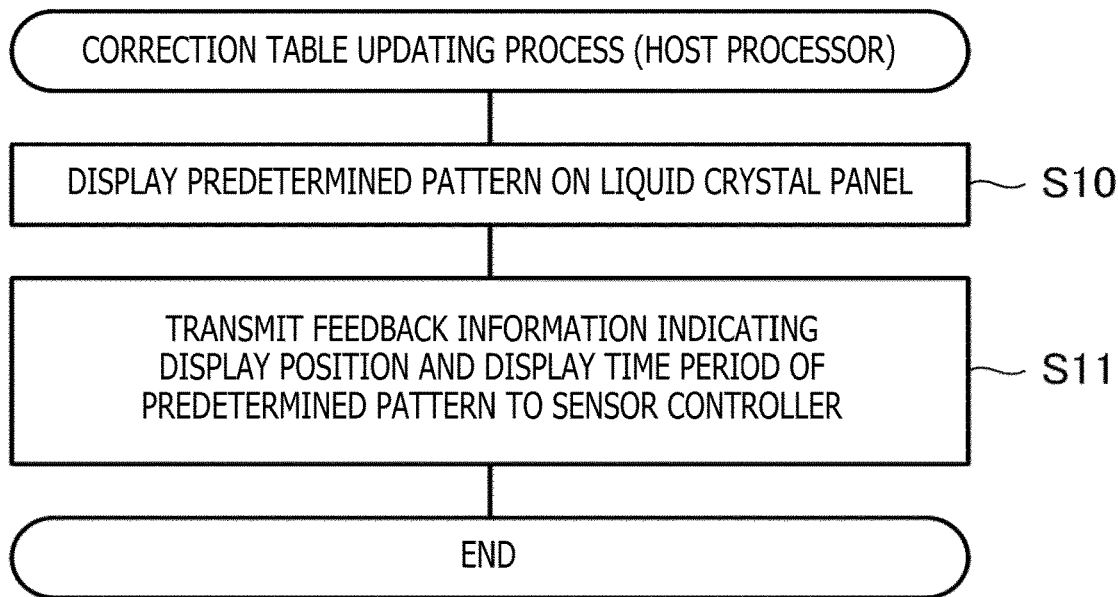
FIGS. 6A and 6B illustrate flowcharts depicting a correction table updating process according to the first embodiment of the present invention.
Figure 6B:
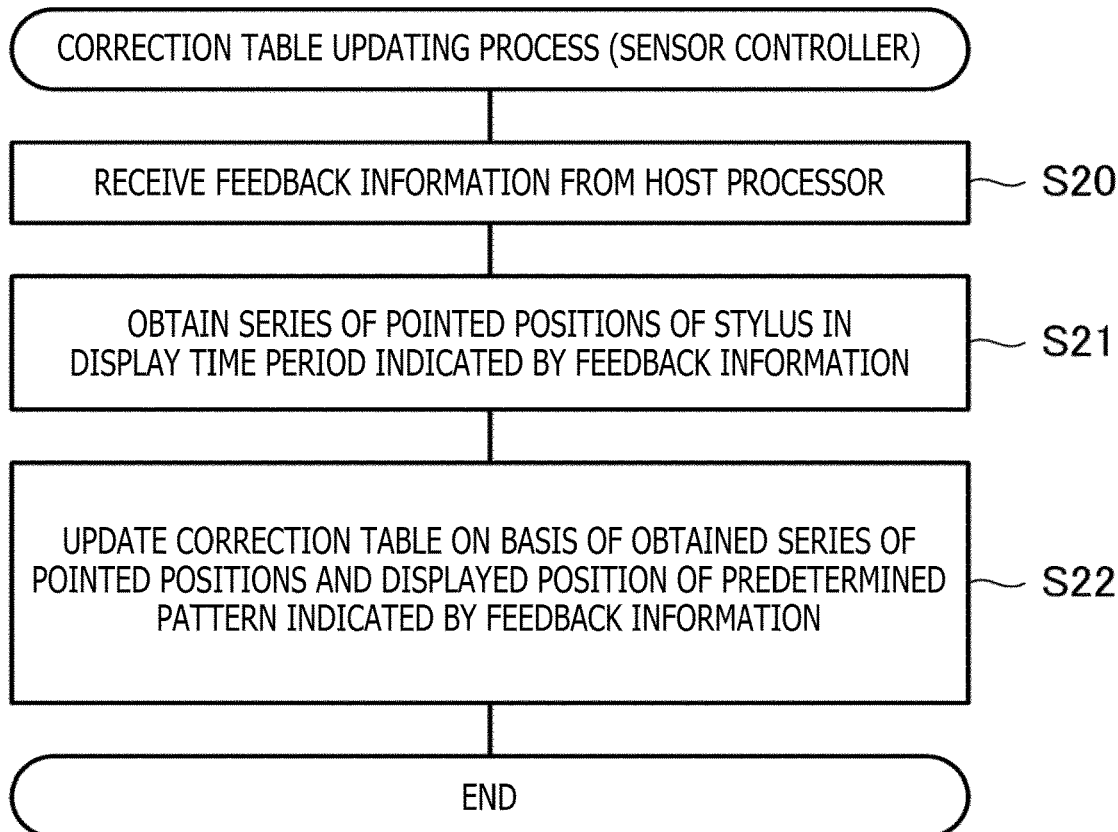

FIGS. 6A and 6B illustrate flowcharts depicting a correction table updating process according to the present embodiment. The correction table updating process is a process executed by the host processor 2 and the sensor controller 4 in cooperation with each other, and FIG. 6A depicts the processes executed on the side of the host processor 2 and FIG. 6B depicts the processes executed on the side of the sensor controller 4.

With reference to FIG. 6A first, the host processor 2 is configured to execute a process of displaying on the liquid crystal panel 3a a predetermined pattern to urge the user to perform the operation of tracing the touch plane 5a over a predetermined continuous section using the stylus 10 (step S10) and a process of transmitting feedback information that indicates the display position and the display time period of the predetermined pattern, to the sensor controller 4 (step S11).

Figure 7:
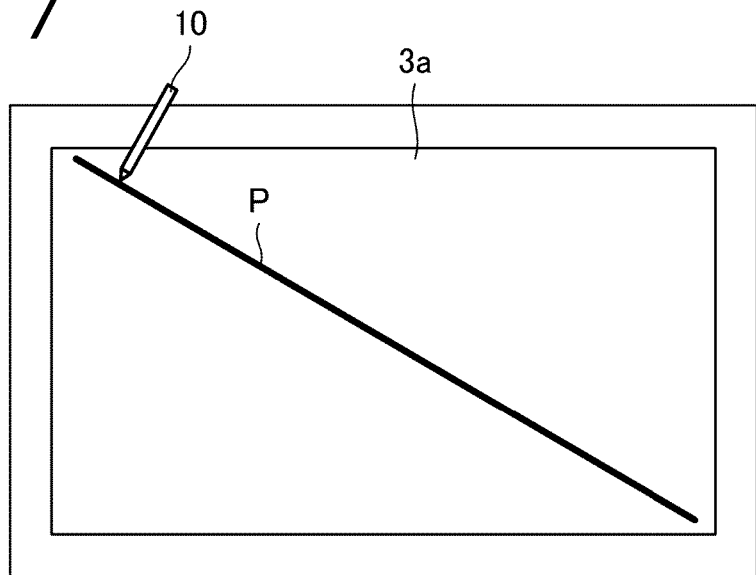
FIG. 7 is a diagram depicting an example of a predetermined pattern displayed at step S10 in FIG. 6A.

FIG. 7 is a diagram depicting an example of the predetermined pattern displayed at step S10 in FIG. 6A. The host processor 2 according to this example displays a line P that corresponds to a diagonal line of the screen of the liquid crystal panel 3a as the predetermined pattern. In this regard, the specific shape of the predetermined pattern is not limited to the line P. For example, a line corresponding to one side of the screen of the liquid crystal panel 3a may be used as the predetermined pattern. Moreover, a curved line or a polygonal line is usable as the predetermined pattern.

With reference to FIG. 6B, the sensor controller 4 receives the feedback information transmitted by the host processor 2 at step S11 (step S20: a reception step) and obtains the series of pointed positions of the stylus 10 in the display time period indicated by the feedback information (step S21). The pointed position obtained at this step is the pointed position detected at step S1 in FIG. 4 (the pointed position before the correction using the correction table). The sensor controller 4 thereafter executes a process of updating the correction table on the basis of the series of the obtained pointed positions and the display position of the predetermined pattern indicated by the feedback information (step S22: a feedback step). In this process, at least some of the plural calibration values stored in the correction table are updated. In this manner, when the information indicating what display the host processor 2 currently executes is obtained using the feedback information, the sensor controller 4 can obtain the calibration value on the premise that the user performs the tracing operation in accordance with the display using the stylus 10.

Figure 8:
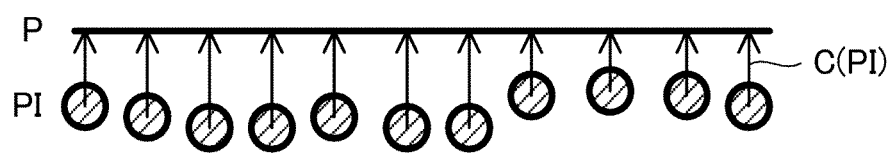
FIG. 8 is a diagram explaining an example of a process executed at step S22 in FIG. 6B.

FIG. 8 is a diagram explaining an example of a process executed at step S22. The sensor controller 4 according to this example executes a process of projecting each of the series of pointed positions PI onto the line P. In this process, the pointed position PI at the time when the "pen-down" is detected is caused to correspond to the starting point of the line P, the pointed position PI at the time when the "pen-up" is detected is caused to correspond to the ending point of the line P, and the pointed positions PI therebetween are caused to correspond to the points in the middle of the line P. The orientation and the length of a vector having each of the pointed positions PI as its starting point and having each of the corresponding projected points as its ending point are thereafter derived as the calibration value C(PI). The correction table is thereafter updated using the calibration value C(PI) derived as above.

Concerning the above, the pointed position PI obtained at step S21 may not match with any of the plural positions stored in the correction table. Moreover, it is difficult to cover the plural positions stored in the correction table using only the series of pointed positions PI obtained by causing the user to trace the predetermined pattern. The sensor controller 4 therefore may derive the calibration values C(PI) for other positions by extrapolating the calibration values C(PI) derived for the series of pointed positions PI obtained by causing the user to trace the predetermined pattern. More specifically, for example, a bias amount corresponding to the intercept of the straight line obtained in the case where the series of detected coordinates are straight line-approximated is determined and this bias amount is set to be the calibration value in the vicinity of the tracing position at which the predetermined pattern is displayed. The correction table can be updated by executing as above, for the positions that are not included in the series of pointed positions PI obtained by causing the user to trace the predetermined pattern.

As has been described above, according to the present embodiment, the calibration values in the correction table can be updated based on the pointed position of the stylus 10 on the touch plane 5a obtained when the predetermined pattern is displayed on the liquid crystal panel 3a and the display position of this predetermined pattern on the liquid crystal panel 3a. The gap between the pen coordinate and the display position of the ink data can therefore be accurately corrected.

In addition, the case where only the one line P is used as the predetermined pattern as depicted in FIG. 7 has been taken in the present embodiment while plural patterns may be used. In this case, the processes depicted in FIGS. 6A and 6B are advantageously executed for each of the plural patterns. In other words, the host processor 2 is advantageously configured to sequentially display the plural patterns on the liquid crystal panel 3a, and the processes depicted in FIG. 6B are advantageously executed by the sensor controller 4 every time each of the plural patterns is caused to be displayed by the host processor 2.

The feedback information is satisfactory only when this information can inform the sensor controller 4 of the display pattern currently displayed by the processor 2, and the feedback information may be condensed data. For example, as far as agreed upon between the sensor controller 4 and (a predetermined program operated by) the host processor 2 in advance, the feedback information may be data like an ID for identifying the display pattern such as the tracing position and the tracing shape.

Moreover, when the host processor 2 displays the predetermined pattern at step S10 in FIG. 6A, the host processor 2 may display on the liquid crystal panel 3a also the holding angle designation information to designate the holding angle of the stylus in the display of the predetermined pattern for the user. The updating of the correction table can be executed in the state where the stylus 10 is held at the designated angle, by executing the above. The designation of the holding angle may be designation of the value of the angle such as "please hold the stylus perpendicularly to the panel face" or may be designation of the angle for the ordinary use status such as "please hold the stylus at the angle for you to usually hold a pen." Furthermore, the designation may be designation of the position of the viewpoint for the user to usually draw using the stylus. The calibration amount in the state where the active stylus 10 is naturally held with the viewpoint position at which the user usually and naturally draws can be derived by executing the above.

Moreover, the host processor 2 may cause the liquid crystal panel 3a to display the same pattern for plural times, may obtain the series of pointed positions from the sensor controller 4 every time the above display is executed, and may obtain the calibration value to be set in the correction table by executing a statistical process on the basis of these obtained pointed positions. The statistical process executed in this case advantageously includes an approximation formula obtained by approximating the series of pointed positions to a predetermined function and a derivation process for the error from the pattern displayed on the liquid crystal panel 3a, and the statistical process more advantageously is a process of machine-learning the position calibration value suitable for each of the plural positions arranged on the touch plane 5a on the basis of the derived error. Moreover, the feedback information in this case advantageously includes information indicating the result of the statistical process (more specifically, information to vary the calibration value in the direction for the derived error to become small), and the sensor controller 4 advantageously updates the correction table on the basis of the feedback information.

The correction table is stored in the memory 4b of the sensor controller 4, and the correction process for the pointed position and the updating process for the correction table are both executed by the sensor controller 4 in the present embodiment while the correction table may be stored in the memory 2b of the host processor 2 and the correction process for the pointed position and the updating process for the correction table may both be executed by the host processor 2.

Moreover, the example where the correction table storing therein the calibration values of the pointed positions is updated has been described in the present embodiment while the present invention is also applicable to the case where a correction table is updated that stores therein calibration values for a physical amount other than the position such as the tilt angle (the inclination angle) or the azimuth (the angle of direction) of the stylus 10. Description will be made in detail below for the tilt angle with reference to FIG. 9 to FIG. 11B. Though not described in detail, the same will also be applied to the azimuth.

Figure 9:
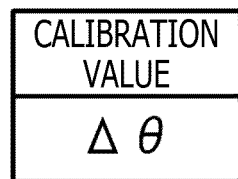
FIG. 9 is a diagram depicting a correction table according to a modification example of the first embodiment of the present invention.

FIG. 9 is a diagram depicting a correction table according to a modification example of the present embodiment. This correction table stores therein the calibration values for the tilt angle of the stylus 10 (tilt angle calibration values). The tilt angle calibration value is represented by a difference of the angle (AO). Though not depicted, similarly to the correction table storing therein the calibration values for the position, the correction table storing therein the calibration values of the tilt angle may include the calibration value in accordance with each one-dimensional or two-dimensional position or each relative position for each partial area, or a three-dimensional correction table having the inclination value added thereto in addition to the position may be used.

FIG. 10 is a sequence diagram depicting operations of the electronic device 1 including the correction process for the tilt, that uses the correction table according to this modification example. In addition, though not depicted in FIG. 10, steps S31 to S33 described below are executed in parallel to steps S1 to S3 depicted in FIG. 4.

The sensor controller 4 according to this modification example first detects the tilt angle of the stylus 10 (step S31). The specific detection method for the tilt angle will be described in detail in the second embodiment described later. The sensor controller 4 next reads the tilt angle calibration value from the correction table, corrects the tilt angle on the basis of the read tilt angle calibration value, and thereby derives the tilt angle for outputting (step S32). The sensor controller 4 reports the derived tilt angle for outputting to the host processor 2 (step S3). The processes executed by the host processor 2 receiving the report for the tilt angle are same as the processes executed at steps S5 to S7 depicted in FIG. 4. In this case, however, the production of the ink data at step S5 is executed on the basis of also the tilt angle.

Figure 11A:
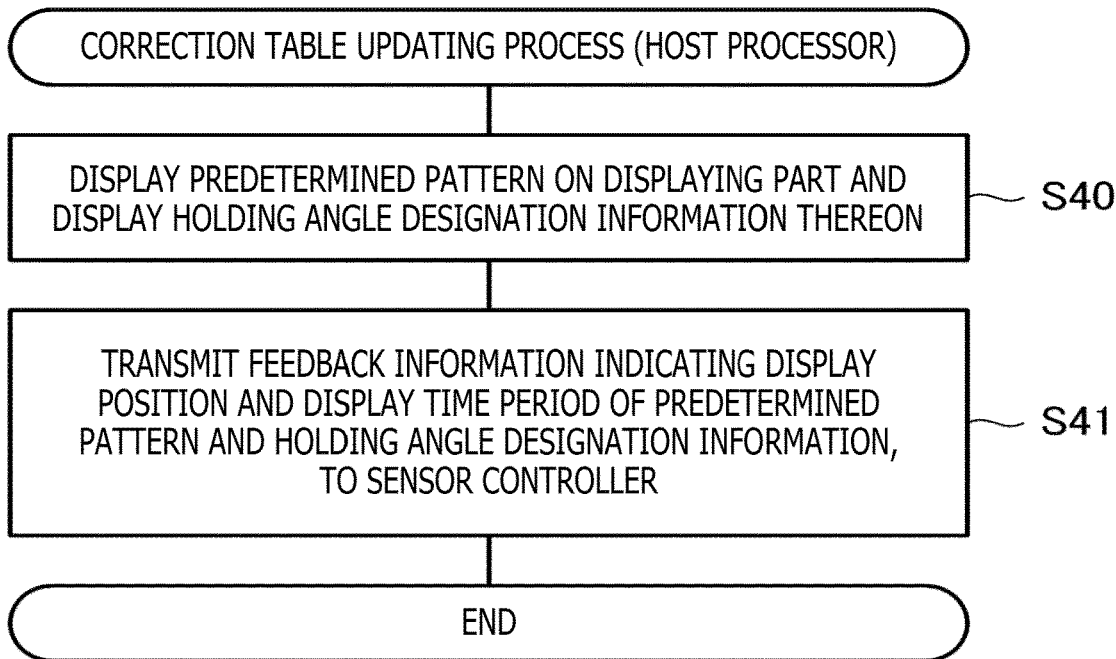
FIGS. 11A and 11B illustrate flowcharts depicting a correction table updating process according to a modification example of the first embodiment of the present invention.
Figure 11B:
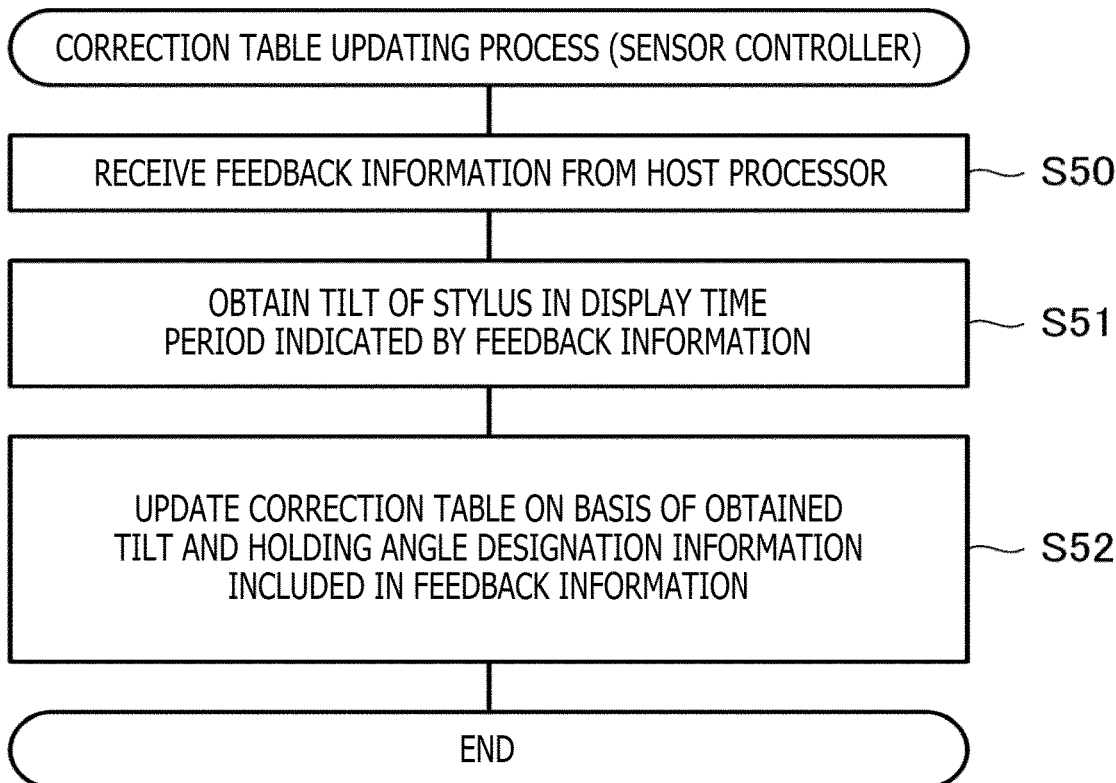

FIGS. 11A and 11B illustrate flowcharts depicting a correction table updating process according to this modification example. Similar to the case in FIGS. 6A and 6B, the correction table updating process in this case is also a process executed by the host processor 2 and the sensor controller 4 in cooperation with each other, and FIG. 11A depicts the processes executed on the side of the host processor 2 and FIG. 11B depicts the processes executed on the side of the sensor controller 4. In addition, though not depicted in FIG. 11B, steps S51 and S52 depicted in FIG. 11B are executed in parallel to steps S21 and S22 depicted in FIG. 6B.

With reference to FIG. 11A first, the host processor 2 causes the liquid crystal panel 3a to display thereon the holding angle designation information described above together with the predetermined pattern that is similar to that of the case in FIG. 6A (step S40). The host processor 2 transmits the feedback information that indicates the display position and the display time period of the predetermined pattern and the holding angle designation information, to the sensor controller 4 (step S41).

With reference to FIG. 11B, the sensor controller 4 receives the feedback information transmitted at step S11 by the host processor 2 (step S50) and obtains the tilt angle of the stylus 10 in the display time period indicated by the feedback information (step S51). The tilt angle obtained at this step is advantageously set to be the average value in the display time period of the tilt angle detected at step S31 in FIG. 10 (the tilt angle before the correction using the correction table). The sensor controller 4 thereafter executes the process of updating the correction table on the basis of the obtained tilt angle, and the holding angle designation information included in the feedback information (step S52).

More specifically, the tilt angle calibration value is updated such that the tilt angle after the correction derived at step S32 in FIG. 10 approaches the tile angle indicated by the holding angle designation information. The tilt angle supplied to the host processor 2 can be set to be close to the value of the actual tilt angle, by executing the above.

The second embodiment of the present invention will next be described. The basic configuration and the basic functions of the electronic device 1 according to the present embodiment are similar to those of the electronic device 1 described in the first embodiment. The feature of the present embodiment is the point that the sensor controller 4 corrects the pointed position of the stylus 10 in real time on the basis of the tilt angle of the stylus 10. The detailed description will be made below mainly for this feature.

Figure 12:
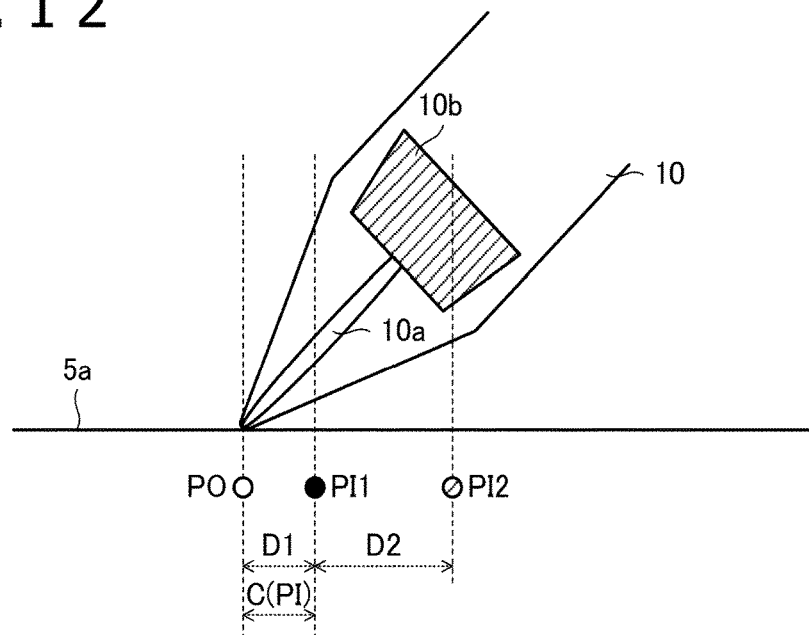
FIG. 12 is an explanatory diagram for the configuration of a stylus, a first pointed position, a second pointed position, a pointed position, and a calibration value according to a second embodiment of the present invention.

FIG. 12 is an explanatory diagram for the configuration of the stylus 10, a first pointed position PI1, a second pointed position PI2, a pointed position PO, and a calibration value C(PI) according to the present embodiment. As depicted in FIG. 12, the stylus 10 according to the present embodiment includes an additional electrode 10b (a second electrode) to detect the tilt angle, in addition to the pen electrode 10a (the first electrode) depicted in FIG. 5, in the vicinity of the pen tip. The additional electrode 10b is disposed in the vicinity of the end portion of the pen electrode 10a on the opposite side of the end portion on the side of the pen tip.

The first pointed position PI1 is the position that is detected using the pen electrode 10a (a first value), and the second pointed position PI2 is the position that is detected using the additional electrode 10b (a second value). The specific scheme used by the sensor controller 4 to detect the first pointed position PI1 and the second pointed position PI2 is optional while, for example, the first pointed position PI1 may be detected in the capacitance scheme and the second pointed position PI2 may be detected in the active capacitance scheme. In this case, the detection of the first pointed position PI1 in the capacitance scheme is executed on the basis of the variation of the capacitance generated between the plural linear electrodes 5x and 5y depicted in FIG. 1 and the pen electrode 10a. Moreover, the detection of the second pointed position PI2 in the active capacitance scheme is executed on the basis of the pen signal (more specifically, the position signal described above) transmitted by the stylus 10 through the additional electrode 10b. The detailed detection method of each of the above is as described above. When the first pointed position PI1 is detected in the capacitance scheme, the pointed position by the user's finger and the pointed position by the pen electrode 10a need to be distinguished from each other, and the distinction therebetween may be executed by, for example, when the detected pointed position is present within a predetermined range from the second pointed position PI2 detected immediately previously, determining the detected pointed position to be the pointed position by the pen electrode 10a and, otherwise, determining the detected pointed position to be the pointed position by the user's finger.

The sensor controller 4 may detect both the first pointed position PI1 and the second pointed position PI2 in the active capacitance scheme. In this case, the stylus 10 executes the transmission of the pen signal using the pen electrode 10a as an antenna and the transmission of the pen signal using the additional electrode 10b as an antenna in the time-sharing manner. Moreover, each of the pen signals is caused to include one-bit information that indicates the electrode used as the antenna for the transmission. The sensor controller 4 can sequentially receive both of the pen signals distinguishing which of the pen electrode 10a and the additional electrode 10b the pen signal is transmitted from, by executing the above. The sensor controller 4 thereafter can obtain the pointed position detected on the basis of the pen signal transmitted from the pen electrode 10a as the first pointed position PI1 and can obtain the pointed position detected on the basis of the pen signal transmitted from the additional electrode 10b as the second pointed position PI2.

The first pointed position PI1, the second pointed position PI2, and the pointed position PO are all equal values when the stylus 10 is not inclined relative to the touch plane 5a. On the other hand, as understood from FIG. 12, these values are different from each other when the stylus 10 is inclined relative to the touch plane 5a. In this case, the second pointed position PI2, the first pointed position PI1, and the pointed position PO are lined in a straight line in this order, and a distance D1 between the first pointed position PI1 and the pointed position PO and a distance D2 between the second pointed position PI2 and the first pointed position PI1 both have larger values as the inclination of the stylus 10 becomes larger. Moreover, the distance D1 has a larger value as the distance D2 becomes larger.

As depicted in FIG. 12, the calibration value C(PI) for the first pointed position PI1 to be obtained has the value of the magnitude equal to that of the distance D1. The sensor controller 4 according to the present embodiment is configured to obtain the calibration value C(PI) on the basis of the second pointed position PI2, correct the first pointed position PI1 on the basis of the obtained calibration value C(PI), and thereby derive the output position. The pointed position derived in this manner is equal to the pointed position PO. This correction and the derivation of the output position will be described in detail with reference to a flowchart of an output position reporting process executed by the sensor controller 4.

Figure 13:
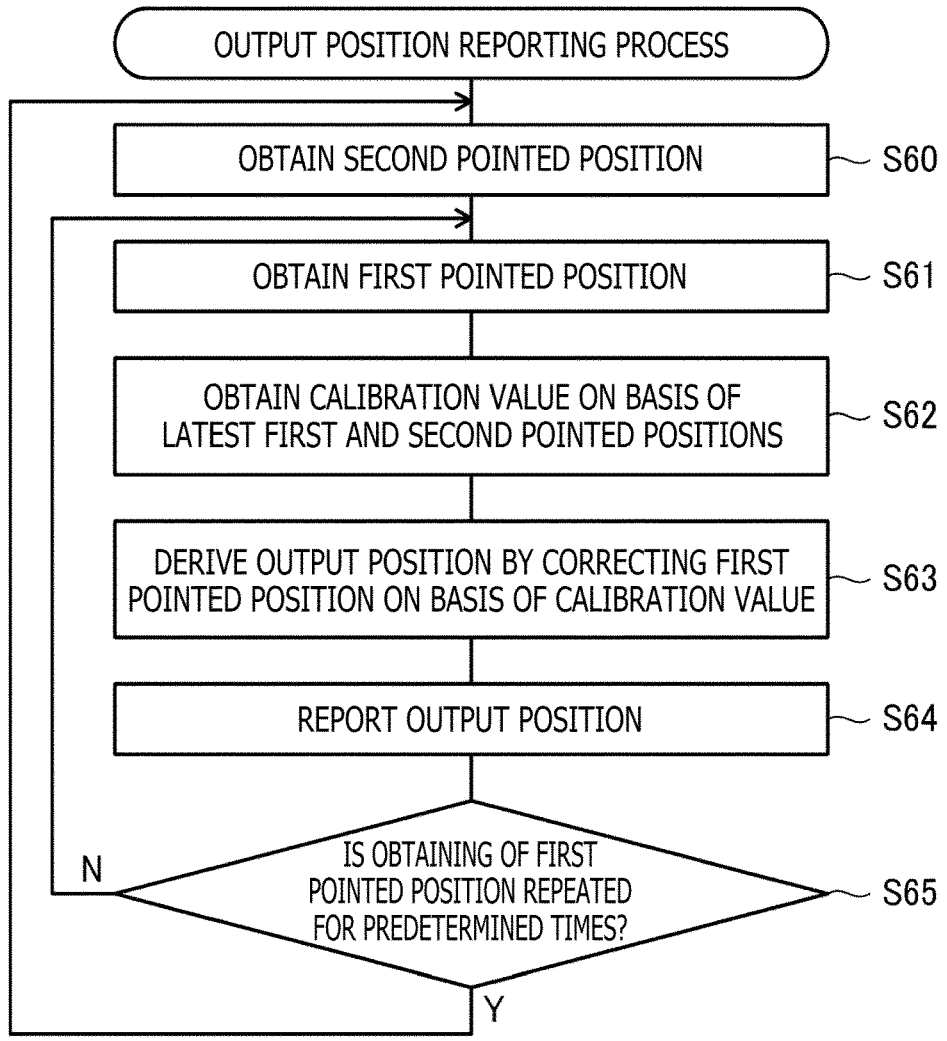
FIG. 13 is a flowchart depicting an output position reporting process according to the second embodiment of the present invention.

FIG. 13 is the flowchart depicting the output position reporting process executed by the sensor controller 4 according to the present embodiment. As depicted in FIG. 13, the sensor controller 4 first obtains the second pointed position PI2 of the stylus 10 in accordance with the active capacitance scheme (step S60: a second value obtaining step). The sensor controller 4 next obtains the first pointed position PI1 of the stylus 10 in accordance with the active capacitance scheme or the capacitance scheme (step S61: a first value obtaining step). The sensor controller 4 thereafter obtains the calibration value for the first pointed position PI1 on the basis of the latest first pointed position PI1 and the latest second pointed position PI2 (step S62).

Figure 14:
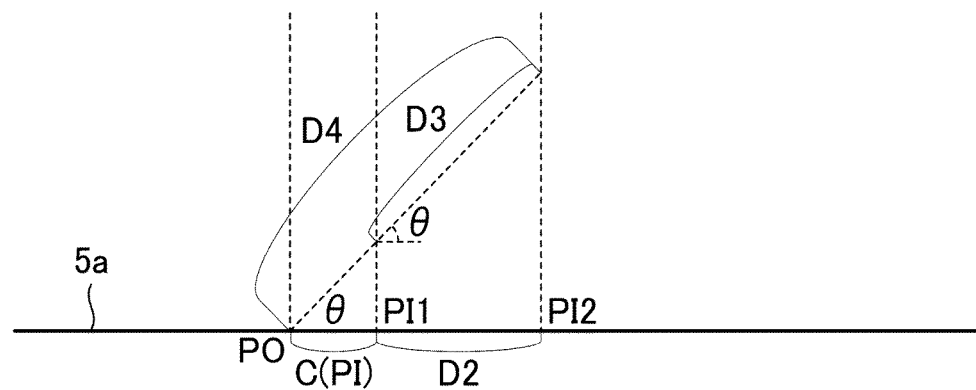
FIG. 14 is an explanatory diagram for a process executed at step S62 in FIG. 13.

FIG. 14 is an explanatory diagram for the process executed at step S62. Distances D3 and D4 depicted in FIG. 14 are respectively the distance between the center of the pen electrode 10a and the center of the additional electrode 10b, and the distance between the pen tip of the stylus 10 and the center of the additional electrode 10b, and are both known values. As understood from FIG. 14, the calibration value C(PI) can therefore be derived by solving Equation (1) below for the calibration value C(PI).

$$C(PI)+D2:D4=C(PI):D4-D3 \quad (1)$$

Equation (2) represents the result obtained by solving Equation (1) for the calibration value C(PI). At step S62, the calibration value C(PI) for the first pointed position PI1 is derived using this Equation (2).

$$C(PI)=(D4-D3)\times D2/D3 \quad (2)$$

Concerning the above, "D2/D3" appearing in Equation (2) can be represented as Equation (3) below using the tilt angle θ of the stylus 10 depicted in FIG. 14.

$$D2/D3=\cos\theta \quad (3)$$

Above Equation (2) can therefore be rewritten as Equation (4) below. In the process at step S62, the tilt angle θ (or the cosine thereof) may first be determined from the distances D2 and D3 using Equation (3), the result of this may be substituted in Equation (4), and thereby the calibration value C(PI) of the first pointed position PI1 may be derived.

$$C(PI)=(D4-D3)\times\cos\theta \quad (4)$$

In addition, the derivation of the calibration value may be executed by reading the calibration amount C(I) in accordance with the distance between the PI2 and PI1 from a memory storing therein this calibration amount C(I) in advance. In addition, for the tilt θ, the normal line direction of the panel plane may be defined to be "0 degrees."

Referring back to FIG. 13, the sensor controller 4 obtaining the calibration value C(PI) next corrects the first pointed position PI1 on the basis of the obtained calibration value C(PI) and thereby derives the output position (step S63: a correction step). As is clear from FIG. 14, the output position derived in this manner becomes the externally dividing point of a line connecting the first pointed position PI1 and the second pointed position PI2 to each other.

The sensor controller 4 reports the output position derived as above to the host processor 2 (step S64: an output step). The first pointed position PI1 corrected on the basis of the calibration value C(PI) obtained on the basis of the second pointed position PI2 (=the pointed position PO) is thereby reported.

After reporting the output position, the sensor controller 4 determines whether or not the obtaining of the first pointed position PI1 is repeated for predetermined times (step S65). Though not depicted, this determination process is similarly executed by the stylus 10. When the sensor controller 4 determines that the obtaining is not repeated for predetermined times, the flow returns to step S61 and, when the sensor controller 4 determines that the obtaining is repeated for predetermined times, the flow returns to step S60. The obtaining of the second pointed position PI2 is thereby executed at a frequency at which one obtaining session thereof is executed every time the obtaining session of the first pointed position PI1 is executed for the plural times. The frequency of obtaining the first pointed position PI1 can be increased by executing the above.

As described above, according to the present embodiment, the pointed position of the stylus 10 can be corrected on the basis of the second pointed position PI2, and the gap can therefore be accurately corrected between the pen coordinate and the display position of the ink data.

The pointed position of the stylus 10 is corrected on the basis of the second pointed position PI2 in the present embodiment while the pointed position of the stylus 10 may be corrected on the basis of the value (the second value) relating to the stylus 10 other than the second pointed position PI2. For example, in the case where the stylus 10 has a gyro mounted thereon, the tilt angle θ of the stylus 10 may be obtained from the output of the gyro, the calibration value C(PI) may be determined in accordance with above Equation (4), and the pointed position of the stylus 10 may be corrected using the result of the determination.

When the second pointed position PI2 is obtained at step S60 in FIG. 13, in the case where the obtained second pointed position PI2 is positioned in an area outside the screen of the liquid crystal panel 3a (that is a what-is-called bezel area), the correction of the pointed position may be corrected without using this second pointed position PI2 but using the latest tilt angle θ obtained so far. This point will be described in detail below with reference to FIG. 15 and FIG. 16.

Figure 15:
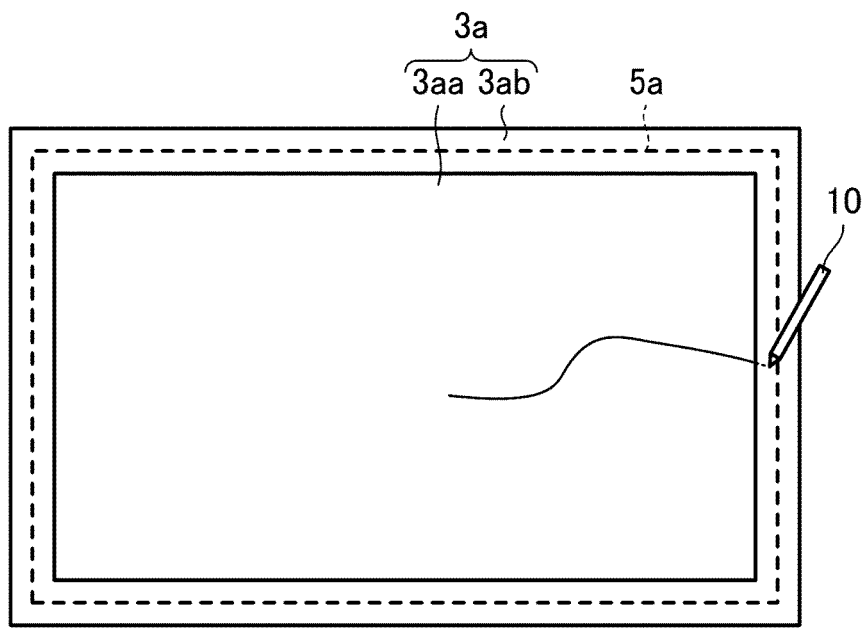
FIG. 15 is an explanatory diagram for a first modification example of the second embodiment of the present invention.

FIG. 15 is an explanatory diagram for a first modification example of the present embodiment. As depicted in FIG. 15, the liquid crystal panel 3a of the liquid crystal displaying apparatus 3 has a configuration to have a bezel area 3ab disposed on the circumference of the display area 3aa. In the bezel area 3ab, various types of wires are arranged that are necessary for connecting the electrodes and the like in the display area 3aa and a driving circuit (not depicted) of the liquid crystal displaying apparatus 3 to each other. The touch plane 5a is formed to be somewhat larger than the display area 3aa as depicted in FIG. 15, and the sensor controller 4 is thereby configured to be able to detect the pointed position of the stylus 10 also on the periphery of the display area 3aa.

Concerning the above, in the case where the stylus 10 is positioned in the vicinity of the edge portion of the touch plane 5a, the state may occur where the pen electrode 10a is positioned on the inner side of the touch plane 5a but the additional electrode 10b is positioned on the outer side of the touch plane 5a. In this state, the sensor controller 4 fails in obtaining the second pointed position PI2 at step S60 in FIG. 13 and therefore cannot obtain the calibration value at step S62.

In this modification example, therefore, first, as a premise, the sensor controller 4 is configured to derive the tilt angle θ (or the cosine thereof) before executing the process at step S62 and, at step S62, derive the calibration value C(PI) of the first pointed position PI1 by substituting the tilt angle θ in above Equation (4). The sensor controller 4 is also configured to execute the derivation of the calibration value using the latest tilt angle θ that is derived so far in the case where the sensor controller 4 cannot normally obtain the second pointed position PI2. The sensor controller 4 can continuously derive the calibration value C(PI) by executing as above even in the case where the sensor controller 4 fails in obtaining the second pointed position PI2. The output position reporting process executed by the sensor controller 4 according to this modification example will be described in detail with reference to a flow chart of this process.

Figure 16:
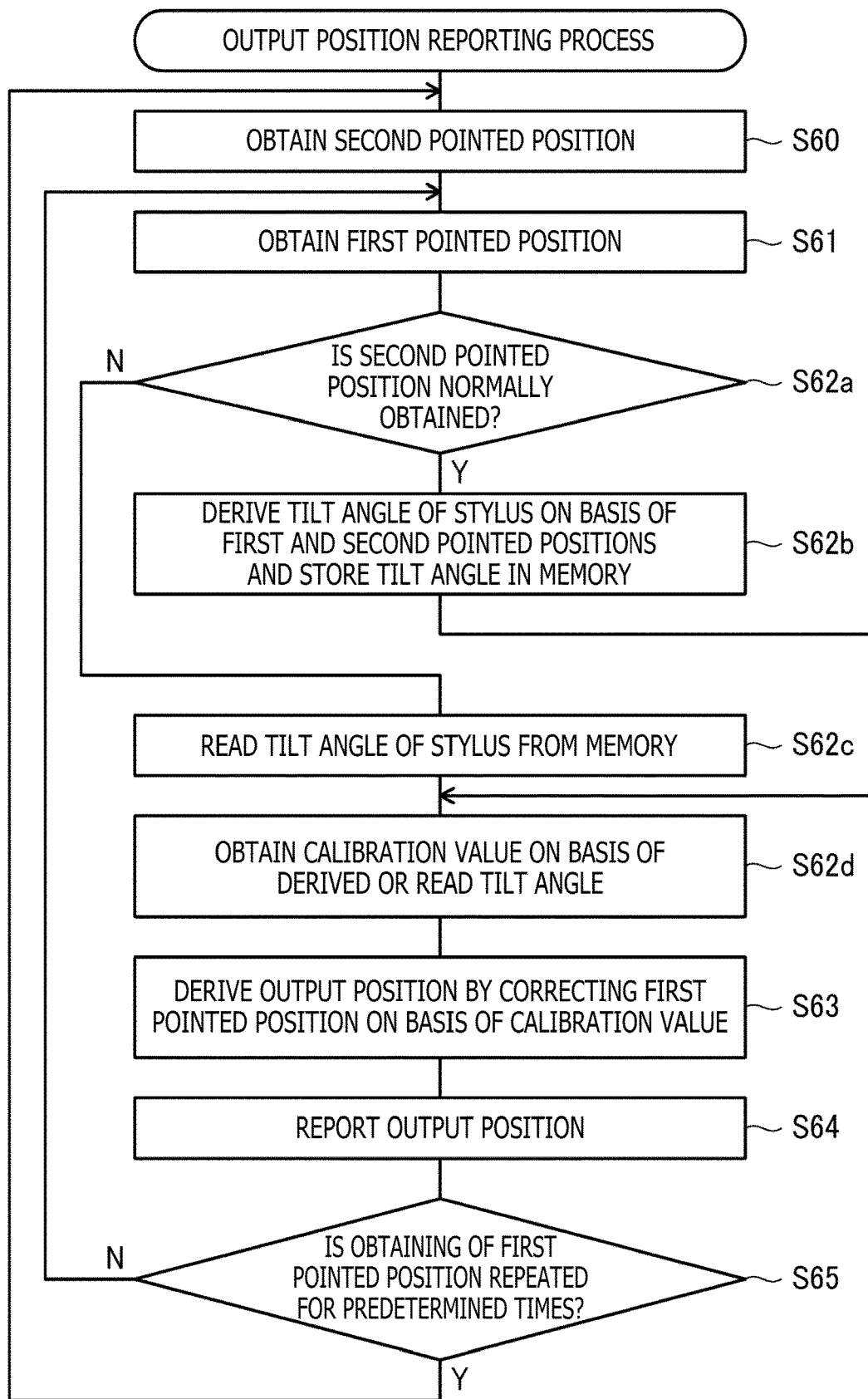
FIG. 16 is a flowchart depicting an output position reporting process according to the first modification example of the second embodiment of the present invention.

FIG. 16 is a flowchart depicting the output position reporting process executed by the sensor controller 4 according to this modification example. As understood from a comparison with FIG. 13, this flowchart has step S62 decomposed into steps S62a to S62d. The description will be made below noting the different points from the flowchart in FIG. 13.

The sensor controller 4 obtaining the first pointed position PI1 at step S61 determines whether or not the second pointed position PI2 is normally obtained at step S60 (step S62a). In the case where the sensor controller 4 determines that the second pointed position PI2 is normally obtained, the sensor controller 4 derives the tilt angle θ (or the cosine thereof) of the stylus on the basis of the first pointed position PI1 and the second pointed position PI2, and stores these positions in the memory 4b (see FIG. 1) (step S62b). More specifically, this derivation only has to be executed in accordance with above Equation (3).

On the other hand, in the case where the sensor controller 4 determines that the second pointed position PI2 is not normally obtained at step S62a, the sensor controller 4 reads the tilt angle θ of the stylus from the memory 4b (step S62c). The latest tilt angle θ derived so far is thereby read.

After step S62b or step S62c comes to an end, the sensor controller 4 obtains the calibration value C(PI) for the first pointed position PI1 on the basis of the tilt angle θ derived at step S62b or the tilt angle θ read at step S62c (step S62d). More specifically, this obtaining only has to be executed in accordance with above Equation (4).

As above, according to this modification example, even in the case where the second pointed position PI2 cannot normally be obtained because the stylus 10 is positioned in the vicinity of the edge portion of the touch plane 5a, the calibration value C(PI) for the first pointed position PI1 can be derived using the tilt angle θ obtained so far. In addition, it is considered that the case where the stylus 10 is positioned in the bezel area 3ab depicted in FIG. 15 is usually the case where the stylus 10 jumps out of the display area 3aa due to the inertia of the writing and it is considered that the value of the tilt angle θ maintains a specific value in this case. It is therefore considered that the drawing result does not substantially become unnatural even when the tilt angle θ derived in the past is used as in this modification example.

Moreover, the additional electrode 10b is used to obtain the second pointed position PI2 in the present embodiment while the second pointed position PI2 may be obtained using another method. An example thereof will be described below with reference to FIG. 17.

Figure 17:
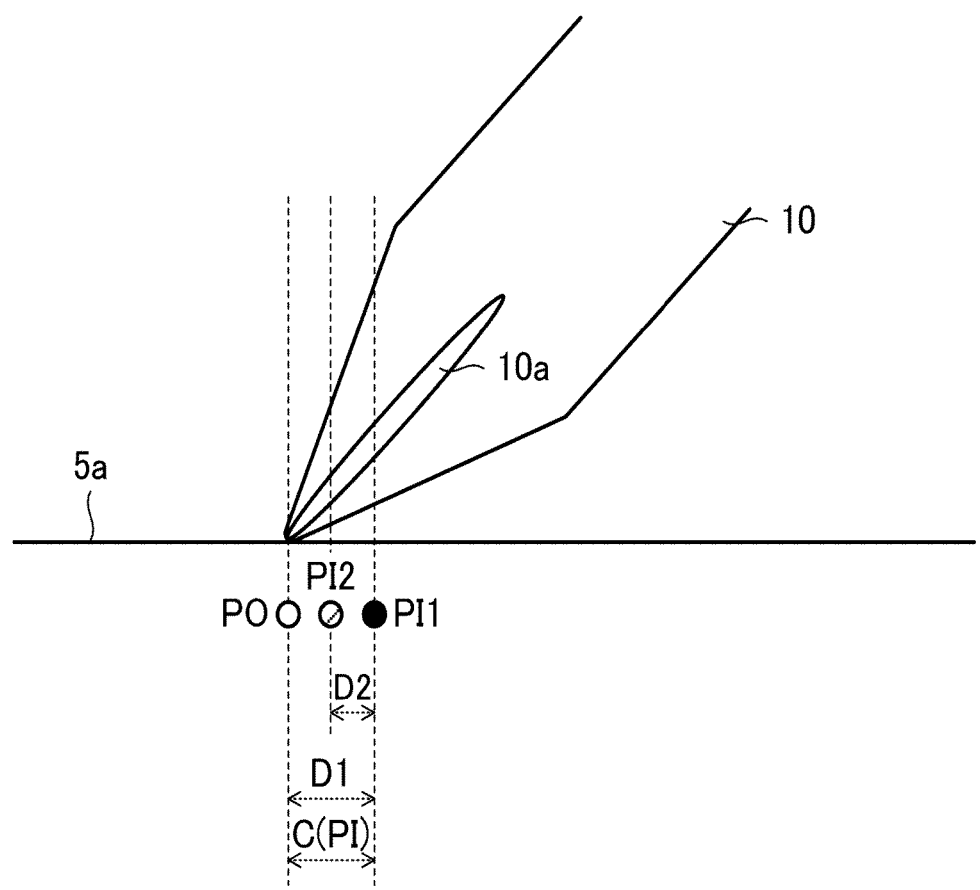
FIG. 17 is an explanatory diagram for the configuration of a stylus, a first pointed position, a second pointed position, a pointed position, and a calibration value according to a second modification example of the second embodiment of the present invention.

FIG. 17 is an explanatory diagram for the configuration of a stylus 10, a first pointed position PI1, a second pointed position PI2, a pointed position PO, and a calibration value C(PI) according to a second modification example of the present embodiment. As depicted in FIG. 17, the stylus 10 according to this modification example does not have the additional electrode 10b disposed therein.

The sensor controller 4 according to this modification example is configured to obtain the first pointed position PI1 on the basis of the pen signal transmitted by the stylus 10 through the pen electrode 10a and, on the other hand, obtain the second pointed position PI2 on the basis of the variation of the capacitance generated between the plural linear electrodes 5x and 5y (see FIG. 1) and the pen electrode 10a. In sum, in this modification example, the same pen electrode 10a is detected using both the capacitance scheme and the active capacitance scheme, and the pointed positions detected using the schemes are obtained as the first pointed position PI1 and the second pointed position PI2.

The memory 4b stores therein in advance a function representing the relation between the distance D2 according to this modification example (the distance between the second pointed position PI2 and the first pointed position PI1) and the tilt angle θ of the stylus 10, as one of the properties of the stylus 10. The sensor controller 4 reads this function from the memory 4b in accordance with the unique ID received from the stylus 10, uses the read function instead of Equation (3), and thereby derives the tilt angle θ. The tilt angle θ can also be derived in this modification example as above, and the sensor controller 4 therefore can thereafter obtain the calibration value C(PI) and can correct the first pointed position PI1 on the basis of the obtained calibration value C(PI), in the same manner as that of the process described with reference to FIG. 13 or FIG. 16. In this modification example, the gap can therefore be also corrected between the pen coordinate and the display position of the ink data.

In addition, the coordinate calibration in the first embodiment may be executed not for the first pointed position PI1 before the correction but for the first pointed position PI1 after being corrected, in accordance with the tilt angle θ described in the second embodiment. According to this configuration, it is likely that a large error can be derived by computation that is described in the second embodiment and whose calculation load is relatively small, the correction table can thereafter be maintained or updated for the computing result, and the table in the first embodiment can be constituted by a smaller memory.

Moreover, the correction table does not necessarily need to be stored in the form of a table as its data structure. For example, correction data including correlation for the calibration amount to be obtained in accordance with the position, is satisfactorily usable, and the data structure such as a list, arrangement, a look-up table (LUT), address correlation, predetermined function approximation, a neural network, or a coefficient matrix that reproduces the neural network is also usable.

The preferred embodiments of the present invention have been described as above while the present invention is not limited at all by these embodiments and it is natural that the present invention can be implemented in various aspects within the scope not departing from the gist thereof.

FIG. 1
4: Sensor Controller
4a: Processor
4b: Memory
2: Host Processor
2a: Processor
2b: Memory
FIG. 2
Position
Calibration Value
FIG. 4
Sensor Controller
Liquid Crystal Displaying Apparatus
Host Processor
S1: Detect Pointed Position of Stylus
S2: Read Calibration Value Corresponding to Pointed Position
From Correction Table and Correct Pointed Position on Basis
Of Read Calibration Value
Output Position (S3)
S5: Produce Ink Data
S6: Execute Rendering
Display Control (S7)
FIG. 6
Correction Table Updating Process (Host Processor)
S10: Display Predetermined Pattern on Liquid Crystal Panel
S11: Transmit Feedback Information Indicating Display Position
And Display Time Period of Predetermined Pattern to Sensor
Controller
End
Correction Table Updating Process (Sensor Controller)
S20: Receive Feedback Information from Host Processor
S21: Obtain Series of Pointed Positions of Stylus in Display Time
Period Indicated by Feedback Information
S22: Update Correction Table on Basis of Obtained Series of
Pointed Positions and Displayed Position of Predetermined
Pattern Indicated by Feedback Information
End
FIG. 9
Calibration Value
FIG. 10
Sensor Control
Displaying Part
Host Processor
S31: Detect Tilt Angle of Stylus
S32: Read Tilt Angle Calibration Value from Correction Table
And Correct Tilt Angle on Basis of Read Calibration Value
Tilt Angle (S33)
S5: Produce Ink Data
S6: Execute Rendering
Display Control (S7)
FIG. 11
Correction Table Updating Process (Host Processor)
S40: Display Predetermined Pattern on Displaying Part and
Display Holding Angle Designation Information Thereon
S41: Transmit Feedback Information Indicating Display Position
And Display Time Period of Predetermined Pattern and Holding
Angle Designation Information, to Sensor Controller
End
Correction Table Updating Process (Sensor Controller)
S50: Receive Feedback Information from Host Processor
S51: Obtain Tilt of Stylus in Display Time Period Indicated by
Feedback Information
S52: Update Correction Table on Basis of Obtained Tilt and
Holding Angle Designation Information Included in Feedback
Information
End
FIG. 13
Output Position Reporting Process
S60: Obtain Second Pointed Position
S61: Obtain First Pointed Position
S62: Obtain Calibration Value on Basis of Latest First and Second Pointed Positions
S63: Derive Output Position by Correcting First Pointed Position
On Basis of Calibration Value
S64: Report Output Position
S65: Is Obtaining of First Pointed Position Repeated for Predetermined Times?
FIG. 16
Output Position Reporting Process
S60: Obtain Second Pointed Position
S61: Obtain First Pointed Position
S62a: is Second Pointed Position Normally Obtained?
S62b: Derive Tilt Angle of Stylus on Basis of First and Second
Pointed Positions and Store Tilt Angle in Memory
S62c: Read Tilt Angle of Stylus from Memory
S62d: Obtain Calibration Value on Basis of Derived or Read Tilt
Angle
S63: Derive Output Position by Correcting First Pointed Position
On Basis of Calibration Value
S64: Report Output Position
S65: Is Obtaining of First Pointed Position Repeated for Predetermined Times?

What is claimed is:

1. A method executed by a device that is configured to be able to detect a pointed position of a stylus held obliquely by a user to an operation plane being superimposed on a displaying part, the method comprising:
   receiving feedback information including a display position of a predetermined pattern on the displaying part from a host processor; and
   updating at least some of plural position calibration values stored in a correction table that stores therein the position calibration value for each of plural positions arranged on the operation plane, on a basis of the display position of the predetermined pattern included in the received feedback information and a series of pointed positions of a stylus obtained by causing a user to trace the predetermined pattern with the stylus held obliquely by the user on the displaying part, wherein the series of pointed positions of the stylus is different from the display position of the predetermined pattern, wherein the display position of the predetermined pattern is pointed by a tip of the stylus and the series of pointed positions of the stylus are not pointed by the tip of the stylus, wherein the host processor is configured to cause the displaying part to display thereon the predetermined pattern for plural times, and to execute a predetermined statistical process for the pointed positions of the stylus for the plural times detected by the device corresponding to the displaying, and the feedback information includes information that indicates a result of the statistical process.

2. The method according to claim 1, wherein
   the predetermined pattern includes a pattern to urge the user to perform an operation of tracing the operation plane over a predetermined continuous section using the stylus, and
   the feedback information includes information that indicates a display time period of the predetermined pattern by the host processor.

3. The method according to claim 2, wherein
   the updating updates at least some of the plural position calibration values stored in the correction table on a basis of the series of pointed positions of the stylus in the display time period indicated by the feedback information.

4. The method according to claim 3, wherein
   the host processor is configured to cause the displaying part to sequentially display thereon plural patterns including the predetermined pattern, and
   the updating is executed every time each of the plural patterns is displayed by the host processor.

5. The method according to claim 1, wherein the predetermined pattern is a line.

6. The method according to claim 5, wherein
   the line corresponds to a diagonal line of a screen of the displaying part.

7. The method according to claim 5, wherein
   the line corresponds to a side of a screen of the displaying part.

8. The method according to claim 1, wherein
   the host processor is configured to display on the displaying part a holding angle designation information to designate a holding angle of the stylus during display of the predetermined pattern, to the user.

9. The method according to claim 8, wherein
   the correction table further stores therein a tilt angle calibration value to correct the tilt angle of the stylus, the feedback information includes the holding angle designation information, and
   the updating updates the tilt angle calibration value stored in the correction table on a basis of the holding angle designation information included in the received feedback information, and the tilt angle of the stylus obtained when the predetermined pattern is displayed on the displaying part.

10. The method according to claim 1, wherein
    the predetermined pattern includes a pattern to urge the user to perform an operation of tracing the operation plane over a predetermined continuous section using the stylus, and
    the predetermined statistical process is a statistical process that is based on a relation between the predetermined pattern and the series of pointed positions detected by the device when the predetermined pattern is displayed on the displaying part.

11. The method according to claim 10, wherein
    the predetermined statistical process includes a derivation process for an error between an approximation formula obtained by approximating the series of pointed positions detected by the device to a predetermined function, and the predetermined pattern, and
    the feedback information includes information to vary the position calibration value in a direction to reduce the error.

12. The method according to claim 11, wherein
    the predetermined statistical process is a process of machine-learning a position calibration value that is suitable for each of plural positions arranged on the operation plane, on a basis of the error.

13. A method executed by a device that is configured to be able to detect a pointed position of a stylus held obliquely by a user to an operation plane being superimposed on a displaying part, the method comprising:
    obtaining a first value that is a pointed position of the stylus;
    obtaining a second value relating to the stylus;
    deriving an output position by correcting the first value on a basis of a calibration value for the first value obtained on a basis of the second value, wherein the calibration value is updated on a basis of a display position of a predetermined pattern and a series of pointed positions of the stylus obtained by causing a user to trace the predetermined pattern with the stylus held obliquely by the user on the displaying part, wherein the series of pointed positions of the stylus is different from the display position of the predetermined pattern, wherein the display position of the predetermined pattern is pointed by a tip of the stylus and the series of pointed positions of the stylus are not pointed by the tip of the stylus; and
    reporting the output position to the host processor,
    wherein:
    the second value is a pointed position of the stylus that is different from the first value,
    the output position is an externally dividing point of a line that connects the first value and the second value to each other,
    the obtaining the first value and the obtaining the second value are executed in a time-sharing manner,
    the obtaining the second value is executed at a frequency at which the obtaining the second value is executed once every time the obtaining the first value is executed for plural times, and the correcting obtains the calibration value and derives the output position, using the first and the second values that are latest, every time the obtaining the first value is executed.

14. The method according to claim 13, wherein
the calibration value is a value that corresponds to a distance between the output position and the first value, and
the calibration value becomes larger as the distance between the first value and the second value becomes larger.

15. The method according to claim 13, wherein
the obtaining the first value obtains the first value in a capacitance scheme, and
the obtaining the second value obtains the second value on a basis of a pen signal transmitted by the stylus.

16. The method according to claim 15, wherein
the obtaining the first value obtains the first value on a basis of a variation of capacitance generated between plural electrodes arranged in the operation plane and a first electrode disposed in a vicinity of the tip of the stylus.

17. The method according to claim 16, wherein
the obtaining the second value obtains the second value on the basis of the pen signal transmitted by the stylus through a second electrode that is disposed in a vicinity of the tip of the stylus and that is different from the first electrode.

18. The method according to claim 13, wherein
the obtaining the first value obtains the first value on a basis of a pen signal transmitted by the stylus through a first electrode disposed in a vicinity of the tip of the stylus, and
the obtaining the second value obtains the second value on a basis of the pen signal transmitted by the stylus through a second electrode that is disposed in a vicinity of the tip of the stylus and that is different from the first electrode.

19. A method executed by a device that is configured to be able to detect a pointed position of a stylus on an operation plane being superimposed on a displaying part, the method comprising:
obtaining a first pointed position of the stylus on a basis of an electronic charge in accordance with a pen signal produced by a signal generation circuit, the pen signal transmitted by the stylus through a first electrode that is disposed in a vicinity of a pen tip;
obtaining a second pointed position of the stylus on a basis of a variation of capacitance generated between plural electrodes arranged in the operation plane and the first electrode disposed in the vicinity of the pen tip, such that the first electrode is used in obtaining the first pointed position and in obtaining the second pointed position;
detecting a tilt angle of the stylus on a basis of the first and the second pointed positions;
storing the detected tilt angle in a memory;
determining whether or not the second pointed position is normally obtained at the obtaining the second pointed position; and
reading the tilt angle from the memory in a case where it is determined at the obtaining the second pointed position that the second pointed position is not normally obtained.

20. The method according to claim 19, wherein
the detecting the tilt angle derives the tilt angle in accordance with a distance between the first pointed position and the second pointed position.

21. The method according to claim 19, further comprising:
obtaining a calibration value of the first pointed position on a basis of the tilt angle and deriving an output position by correcting the first pointed position on a basis of the obtained calibration value; and
reporting the output position to a host processor.

22. The method according to claim 1 wherein calculation of the series of pointed positions of the stylus includes the following steps:
detecting a tentative pointed position of the stylus;
reading the position calibration value that corresponds to the tentative pointed position from the correction table and deriving an output position by correcting the tentative pointed position on a basis of the position calibration value; and
reporting the output position to the host processor.

* * * * *